(12) United States Patent
Winslow et al.

(10) Patent No.: US 8,054,951 B1
(45) Date of Patent: Nov. 8, 2011

(54) METHOD FOR ORDER TAKING USING INTERACTIVE VIRTUAL HUMAN AGENTS

(75) Inventors: Douglas Winslow, Tampa, FL (US); Anthony Thomas, Palm Harbor, FL (US)

(73) Assignee: Ignite Media Solutions, LLC, McLean, VA (US)

( * ) Notice: Subject to any disclaimer, the term of this patent is extended or adjusted under 35 U.S.C. 154(b) by 1493 days.

(21) Appl. No.: 11/350,895

(22) Filed: Feb. 10, 2006

Related U.S. Application Data

(63) Continuation of application No. 11/117,477, filed on Apr. 29, 2005, now abandoned.

(51) Int. Cl.
*H04M 11/00* (2006.01)

(52) U.S. Cl. .................. 379/88.18; 379/88.01; 704/251; 704/275

(58) Field of Classification Search ............. 379/69, 379/88.16, 88.25, 88.01, 88.18; 704/251, 704/275
See application file for complete search history.

(56) References Cited

U.S. PATENT DOCUMENTS

| | | |
|---|---|---|
| 5,185,782 A | 2/1993 | Srinivasan |
| 5,655,007 A | 8/1997 | McAllister |
| 5,918,213 A | 6/1999 | Bernard et al. |
| 5,956,675 A | 9/1999 | Setlur et al. |
| 6,122,346 A | 9/2000 | Grossman |
| 6,148,063 A | 11/2000 | Brennan et al. |
| RE37,073 E | 2/2001 | Hammond |
| 6,212,262 B1 | 4/2001 | Kamel |
| 6,314,089 B1 | 11/2001 | Szlam et al. |
| 6,383,074 B1 | 5/2002 | Boggs |
| 6,510,414 B1 | 1/2003 | Chaves |
| 6,567,504 B1 * | 5/2003 | Kercheval et al. ............. 379/69 |
| 6,724,864 B1 * | 4/2004 | Denenberg et al. ........ 379/88.16 |
| 6,731,625 B1 | 5/2004 | Eastep et al. |
| 6,771,743 B1 | 8/2004 | Butler et al. |
| 6,771,760 B1 | 8/2004 | Vortman et al. |
| 6,775,366 B1 | 8/2004 | Cobbett et al. |
| 6,775,378 B1 | 8/2004 | Villena et al. |
| 6,778,647 B1 | 8/2004 | Dumas |
| 6,785,653 B1 | 8/2004 | White et al. |
| 6,795,543 B1 | 9/2004 | Cartier et al. |
| 6,934,684 B2 | 8/2005 | Alpdemir et al. |
| 6,941,273 B1 | 9/2005 | Loghmani et al. |
| 2001/0037287 A1 | 11/2001 | Broadbent et al. |
| 2002/0051522 A1 | 5/2002 | Merrow et al. |
| 2002/0076005 A1 | 6/2002 | Bauer |
| 2003/0191648 A1 * | 10/2003 | Knott et al. .................... 704/275 |
| 2004/0128140 A1 | 7/2004 | Deisher |
| 2004/0169722 A1 | 9/2004 | Pena |
| 2005/0053205 A1 | 3/2005 | Hays |
| 2005/0055216 A1 | 3/2005 | Bushey et al. |
| 2005/0197889 A1 | 9/2005 | Prigogin et al. |

* cited by examiner

*Primary Examiner* — Fan Tsang
*Assistant Examiner* — Simon King
(74) *Attorney, Agent, or Firm* — David R. Yohannan; Kelley Drye & Warren LLP

(57) ABSTRACT

Methods combine speech recognition with telephonic sales order processing, in order to automate and improve the efficiency of telephone sales orders, by responding appropriately to vocalizations, pausing for interruption, repeating responses when appropriate, automatically transferring calls to human agents or different automated systems at appropriate points in a transaction, and collecting information. A method accepts incoming sales order calls and appropriately handles order processing. A method connects outgoing calls to customers who have disconnected before completing sales order calls, and appropriately handles sales and order processing.

22 Claims, 3 Drawing Sheets

300

METHOD FOR ORDER TAKING USING INTERACTIVE VIRTUAL HUMAN AGENTS

CROSS-REFERENCE TO RELATED APPLICATIONS

This application is a continuation of U.S. patent application Ser. No. 11/117,477, filed Apr. 29, 2005 now abandoned.

BACKGROUND OF THE INVENTION

1. Field of the Invention

The present invention relates to automated voice recognition and in particular, the use of automated voice recognition in order taking in the sales arena.

2. Description of the Related Art

The use of human agents to make sales calls and process customer orders been prevalent for years. Incoming calls (calls from customers to merchants and service providers) have long been efficiently routed through virtual agents receiving keypad routing from inbound callers. In diverse business areas incoming calls often can be completed without the caller ever interacting with a live agent. Automated systems are often used exclusively for certain tasks, by responding to commands provided by callers through keypad entry or vocally. In fact, many automated telephone systems require an incoming caller to request an agent specifically if they have a need that is not fulfilled by the automated portion of the system, otherwise callers are never transferred to a live agent.

However, there has been some difficulty in automating sales calls, that is, calls made between customers and merchants. The emotional needs of customers calling to place orders for commercial products have typically not been met by automated systems. Merchants who accept telephone orders often wish to translate incoming calls into opportunities to sell more of their product, and the subtlety required to accomplish this goal without alienating customers has not, up to this point, been available from automated systems. Customers who are contacted by automated systems often hang up in frustration before an offer is even made.

Speech recognition systems have developed a great deal in recent years, but practical use for these systems has been limited. Innovation in this area has concentrated on the technical improvement of speech recognition capability (especially pauses, emotional state, word alternatives and accent parsing) rather than in the practical application of speech recognition technology for business uses. Although the technical capacity expanded, the speech-processing industry failed to match the technology to the needs of telemarketers.

Speech recognition systems were inadequate for automating sales-related customer calls either because the speech recognition technology was not capable of parsing complex vocal interactions, or because the underlying decision algorithms were not easily configurable and so did not adequately anticipate the needs of callers with respect to their situational, transactional and emotional needs. For example, in previously developed applications, when customers interrupted lengthy recordings, the message either continued, causing the customer to miss important information, or played again from the beginning, forcing customers to listen to lengthy messages repeatedly. Customers expect either in-person service, or automated service that approximates human behavior.

Because it was necessary for human agents to process sales orders, the cost of processing each order was fixed and could not be reduced by increasing the number of orders. Due to this high cost barrier to entry, many products with low profits in absolute dollar terms could not be processed in small quantities via telephone, because the cost of processing each order consumed or exceeded the profit from the sale.

Once a human agent has engaged in conversation a customer who is placing an order, commonly the customer expects the agent to complete the transaction by collecting payment, shipping and other information "in person" and is not satisfied if the agent transfers the call to an automated system, despite the fact automated systems are more efficient and less error-prone in processing order information. Because human agents must participate in a complete transaction once it has been initiated by a customer, the technology-driven efficiencies common to other telephone-based applications has been limited in the phone sales industry. Human sales agents can only process one order at a time, which severely limits the number of sales that can be made overall. Additionally, human agents must spend time waiting for customers to complete tasks such as making decisions and retrieving their payment information, further limiting the efficiency of the order processing system. Because automation capability has been limited in the area of order processing up to this point, the telephone sales order processing industry has been constrained both in terms of volume and efficiency.

Historically, human agents have been used to process sales calls because they could manage interactions too complex for previously developed automated systems. These interactions include tasks such as altering a sale offer, offering alternative products in response to a customer's situational needs, answering questions asked by a customer, pausing for interruption, and repeating themselves as appropriate.

SUMMARY OF THE INVENTION

The present invention combines speech recognition with telephonic sales order processing, in order to automate and improve the efficiency of telephone sales orders, by responding appropriately to vocalizations, pausing for interruption, repeating responses when appropriate, automatically transferring calls to human agents or different automated systems at appropriate points in a transaction, and collecting information.

The present invention provides a call management application that automates the required steps of a sales order processing call. The call management application connects an outbound call and manages automated vocal interactions.

In one embodiment of the present invention, a method for telephonic sales order processing comprises accepting an incoming connection, playing a recorded greeting, monitoring the vocal responses of the called party, identifying the meaning of the vocal responses of the called party, playing a recording in response to the vocal responses of the called party, repeating a recording if an audible interruption occurs before the recording is complete, recording the vocal responses, and storing information.

In one aspect of the present invention, a response of the called party can be Dual-Tone-Mutli-Frequency (DTMF).

In one aspect of the present invention, any input not DTMF and less than between 0.5 and 1 seconds long is assumed not to be a negative response. A user-defined option allows an audio input less than between 0.5 and 1 seconds long to signify a negative response.

In one aspect of the present invention, if a vocal response or an audio response cannot be verified above a user-defined confidence level, a recording asks the called party to repeat themselves.

In one aspect of the present invention, barge-in during the playing of a recording can be ignored based on configuration.

In one aspect of the present invention, during the playing of a recording only DTMF tones are recognized based on user configuration.

In one aspect of the present invention, several recordings are played in sequence. Audio input is ignored while a recording is played, but after the recording is complete no subsequent recording is played until an audio input is detected. If the detected audio input matches a user-defined expected quantity, the next recording in the sequence is played. If the detected audio input does not match a user-defined expected quantity, the recording is repeated.

In one aspect of the present invention, if the vocal response or audio response of the called party cannot be identified after a user-defined number of attempts, the call is transferred to a live agent.

In one aspect of the present invention, several recordings are played in sequence without waiting for a response. If an audible sound is detected for longer than 0.5 to 1 seconds during the playing of a recording, an alternative recording is played and then the recording that was playing at the time of the interruption is re-played. If an audible sound is detected for longer than 0.5 to 1 seconds during the playing of a recording, an alternative recording is played and then the recording is repeated.

In one embodiment of the present invention, a method for telephonic sales order processing comprises accepting an incoming connection, playing a recorded greeting, monitoring vocal responses of the called party, identifying the meaning of the vocal responses of the called party, playing a recording in response to the vocal responses of the called party, re-connecting a call if the connection is lost before an order has been completed, recording the vocal responses, and storing information.

In one aspect of the present invention, the call is re-connected 15-20 minutes after the original call was disconnected.

In one aspect of the present invention, it is determined that the connection was established with an automated answering system if after a connection is established an audible sound is detected that lasts longer than 1-2 seconds. It is determined that the connection was established with an automated answering system only if the audible sound continues without a pause of more than 0.5 seconds. If silence is detected for more than 2 seconds a recording plays. If an audible sound is detected after the recording starts playing, the recording re-starts from the beginning. A default action is to disconnect the call. Disconnecting the call is never a default action when payment information is being taken.

In one embodiment of the present invention, a method for telephonic sales order processing comprises connecting an outgoing call where no information is known about a called party except the call destination, playing a recorded greeting, monitoring vocal responses of the called party, identifying the meaning of the vocal responses of the called party, playing a recording in response to the vocal responses of the called party, recording the vocal responses, and storing information.

In one aspect of the present invention, several recordings are played in sequence. Audio input is ignored while a recording is played, but where after the recording is complete no subsequent recording is played until an audio input is detected. If the detected audio input matches a user-defined expected quantity, the next recording in the sequence is played. If the detected audio input does not match a user-defined expected quantity, the recording is repeated.

In one aspect of the present invention, if the vocal response or audio response of the called party cannot be identified after a user-defined number of attempts, the call is transferred to a live agent.

In one aspect of the present invention, the called party's request not to be called is recognized and the called number is added to a do not call list.

In one embodiment of the present invention, a method for telephonic sales order processing comprises making a connection, playing a recorded greeting, monitoring vocal responses of the called party, identifying the meaning of the vocal responses of the called party, assuming the audio responses of the called party indicate a user-defined default response if the response cannot be verified above a user-defined confidence level, playing a recording in response to the vocal responses of the called party, recording the vocal responses, and storing information.

DETAILED DESCRIPTION OF THE PREFERRED EMBODIMENTS

The present invention combines speech recognition with telephonic sales order processing, in order to automate and improve the efficiency of telephone sales orders, by responding appropriately to vocalizations, pausing for interruption, repeating responses when appropriate, automatically transferring calls to human agents or different automated systems at appropriate points in a transaction, and collecting information.

Figure 1:
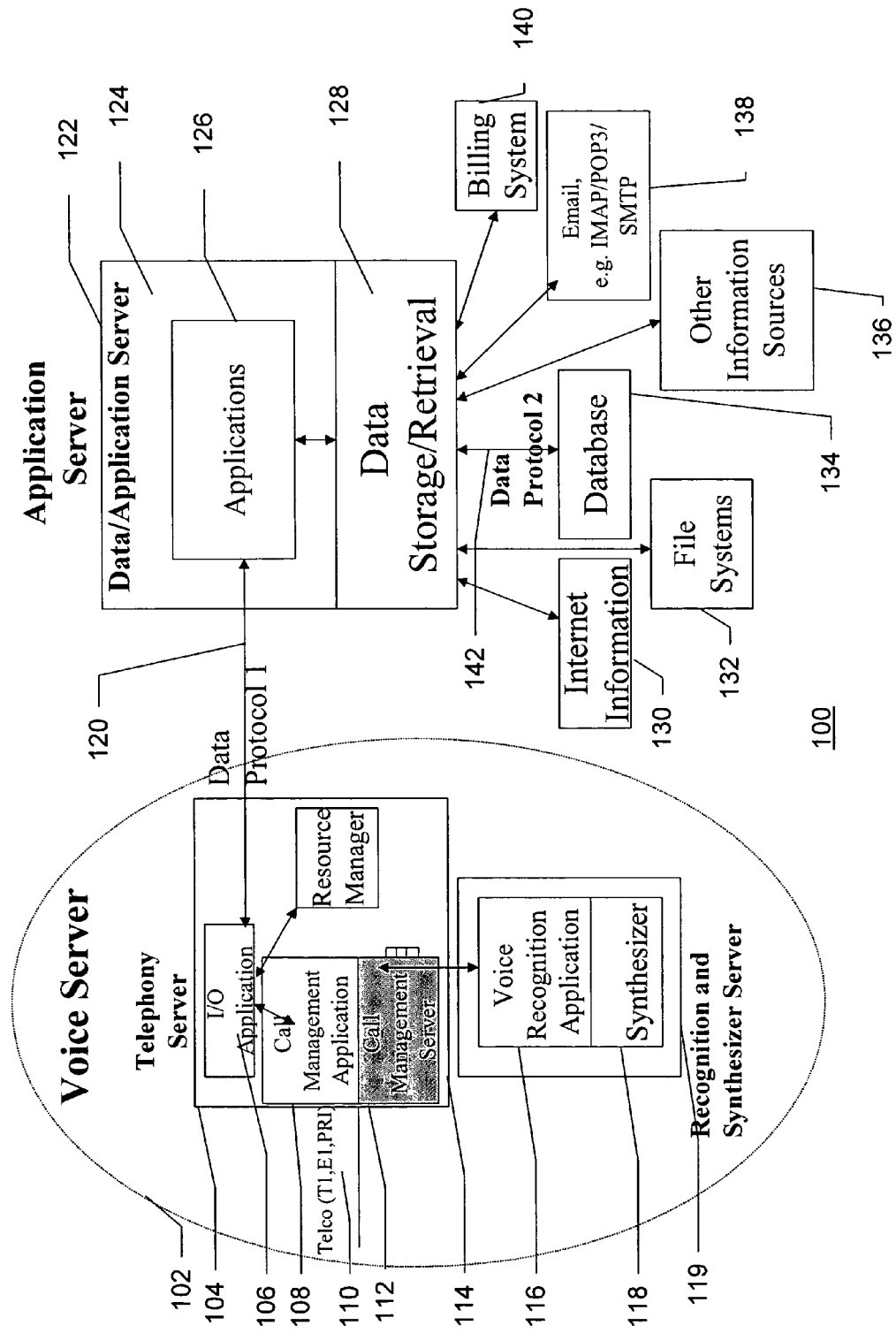
FIG. 1 is an illustration of a system for managing outgoing sales order processing calls.

The present invention provides an automated system for the processing of sales order calls. An example 100 of such a system is shown in FIG. 1. View 100 shows a possible system configuration for processing sales order calls. View 100 shows two servers, a Voice Server 102 and an Application Server 122. A Call Management application 108 on a Call Management Server 112 manages call automation in conjunction with a Recognition and Synthesizer server 119, for example answering or placing a call, detecting connections, playing recordings or synthesizing data into vocal output in real time, parsing vocal input, and transferring calls. A person skilled in the art would know that calls can be connected over a telephone network or other communications network, for example the Internet. For example, when a call is connected over a telephone network, a telephone number may be used to locate the call destination, or when a call is connected over the Internet, a Uniform Resource Locator or Internet Protocol address may be used to locate the call destination. The Call Management Server 112 may be a custom application, or a commercial off-the-shelf application such as NMS COMMUNICATIONS CTACCESS, COMVERSE, BROOKTROUT, OR GLENAYRE. The Recognition and Synthesizer server 119 an be a custom application or a commercial off-the-shelf application such as NUANCE ASR OR SCANSOFT. The voice server 102 can be connected to a communications network 110, such as telephone lines or the Internet. The Application server 122 manages data functions such as data storage and retrieval necessary for processing customer and product information. Data can be accessed locally from storage 128 on the Application server, or on a remote system 130-140 via a network 142.

On the voice server 102, the telephony server 104 retrieves and sends information such as product and personal data from the application server 122. In the course of a call interaction, the call management application 108 plays recordings stored on the Recognition and Synthesizer Server 119 in response to the called party's vocal inputs, which are analyzed by the Voice Recognition Application 116 on the Recognition and Synthesizer Server 119. The person who, or the device that, answers a call is the called party. The recordings can be pre-recorded messages alone or in combination with voice-synthesized real-time data, which is rendered into audio format by the Synthesizer 118. Messages can be stored on the Recognition and Synthesizer Server 119 in digital formats, for example, MP3, REALAUDIO, WINDOWS MEDIA AUDIO (WPA), or MIDI. A person skilled in the art would know that recordings in a system of this type may also be referred to as "prompts". Each prompt may consist of one complete recording, or may consist of several recordings which combine to provide information or to elicit a response. Which prompts are played in response to vocalizations, DTMF, or other inputs are customizable, as are other factors of the interaction between the called or calling party and the automated sales order system.

DTMF stands for Dual Tone Multi-Frequency, the system used by touch-tone telephones. DTMF assigns a specific frequency (consisting of two separate tones) to each key, which may be a number or other symbol, so that it can easily be identified by a microprocessor. The same result can be achieved over a data network by sending the symbol in a digital format.

The Call Management Application 108 is configurable, allowing the Call Management Server 112 to adjust for human and other factors such as response delay, inaudible or unintelligible responses, automated answering system configuration, or human interruption. The Call Management Application 108 can also be configured to adjust for specialized product sales pitches.

For example, factors in the interaction can include the stage of the call at which a type of input is recognizable, the amount of time to wait after an audio response and the playing of a recording, whether a vocal response is parsed by the voice recognition application or assumed to be a default response, the appropriate destination for a call transfer, or the number of errors allowed before a default action is taken. Default actions can include automatically transferring the customer to a live agent, offering different sales terms, or asking the customer to repeat themselves.

A person of ordinary skill in the art would comprehend that a system of this type could handle incoming call interactions as well as outgoing sales calls. Incoming call interactions may provide customers information such as order status, account balance, product availability, or process incoming sales orders.

In one embodiment of the invention, the purpose of the call interaction is to contact customers who had terminated a previous purchase-related call in order to re-establish the transaction. In one application, for example, a customer who called to purchase an advertised product, but disconnected before the order was completed, may be called again after a brief interval and the product offered at more advantageous terms. The delay in re-establishing the contact is configurable. In a preferred embodiment of the application, the call management application calls the customer fifteen to twenty minutes after the initial call was terminated. Another possible variable is the terms at which the product is offered. This variable might vary, for example, based on the prior behavior of the customer. If the customer has rejected prior offers, the terms might be changed; for example, free shipping may be offered, or more of the same item at a lower cost per item. If a customer has previously accepted an offer to buy one product, another product might be offered as an add-on.

In another embodiment of the invention, the purpose of the call interaction is to contact customers who have not previously been contacted. In one application, for example, a list of customer phone numbers would be dialed, and products or services offered for sale. In such an application, it is possible that the customer record will contain no information other than the customer's phone number. In a preferred embodiment of the invention, the terms offered could vary depending upon whether a live person answers the call or a message is left, the area code and prefix of a telephone number called, or the source of the contact information. Other embodiments of the invention are possible, for example, sales terms could remain constant, or the name of the customer could be linked to the call destination information.

For outgoing sales calls, the Call Management application 108 makes an outbound call over a network. Each call interaction can have multiple parts, each of which has user-defined error-correcting options to account for human factors. When the call is answered, the Call Management application 108 determines if the call has been answered by an automated answering system. If an automated answering system has answered the call, the Call Management application 108 can wait until the automated answering system is ready to record a message, and can leave an appropriate message. The type of message that is left can be customized in real time based on previously user defined factors, including the importance of the called party as a customer, the dollar amount of the potential sale, or whether the caller has been contacted previously.

In the case an answering machine is detected, the Call Management Application 108 may attempt to leave a message when the audio is silent for longer than a another user defined interval. The system can be configured to correct errors in answering-device interactions. For example, if interrupted while leaving a message, the Call Management Application may play the message from the beginning, repeating itself up to a user-defined number of times.

If the duration of the initial audio cue which interrupts the greeting is shorter than the user defined interval, the system assumes that a trivial interruption has occurred and that a live customer has answered the call.

Another factor in connecting a call and determining whether the call has been answered by a live customer or an answering device is which communications network is utilized to connect the call, and which communications network the called party is contacted on. For example, different long distance phone service providers vary in the time it takes to connect a call, as do cellular service providers. The same issues arise with Internet voice applications, depending on the carrier and the distance of the target address from the originating Call Management Server. In a preferred embodiment of the invention, if an utterance lasts longer than one second after the call is connected, it is determined that the call has been answered by an answering device.

In other possible applications of the present invention, customers who have made orders in the past may be contacted with new offers, or new customers may be contacted. When new customers are called, the Call Management Application can be configured to check whether the new customer is on a "Do Not Call" list before making a connection.

For one implementation of the Call Management Application 108, error correction, response routing, and customer response options are configurable based on prior customer behavior. For example, after connecting a call, the Call Management Application plays a greeting. The Call Management Application can be configured to behave in various ways during the playing of the greeting. In one implementation, the system waits a user-defined amount of time after call connection for an audio cue. If there is an audio cue, and the duration of the audio cue is longer than a user-defined interval, the Call Management Application interprets the response as an answering machine greeting.

A preferred embodiment of the invention can also be used for other applications. The system can also handle incoming calls made by customers placing orders, or be used by customers to check the status of an existing order.

If the call management system detects that a live person has answered an outgoing call, the call management system will play a series of messages offering products or services. In a preferred embodiment, recordings are played serially such that each recording can have different error correcting or sensitivity features. A prompt may be broken into several recordings played in sequence. For example, if one part of the interaction requires the system to play a speech that is several sentences in length, each sentence or phrase can be broken into several recordings, each of which may have different sensitivity as to what length of an audio cue constitutes an interruption or whether dial tones are ignored. For example, if there is an audio cue that reaches the threshold of an interruption, the system can play an apologetic recording, repeat the recording during which the interruption occurred, and progress to the next recording.

Breaking each prompt into several recordings allows different error correcting and sensitivity combinations to be used within a prompt. For example, the system may be configured to ignore audio responses for one part of a prompt, but may be configured to accept a response at a different part of the prompt. If the system will allow a called party to "barge-in" to a recording, giving a response that can be processed before the recording finishes playing, the system will stop playing the recording and allow the called party to answer. "Barge-in" can be allowed or disallowed separately for vocal or touch-tone inputs.

Many different combinations of error correction and sensitivity are configurable and may be set differently at different points in an interaction. Examples of error correcting variables include whether audio inputs are ignored, whether dial tones are ignored, whether sounds other than dial tones are ignored, what length audio cue constitutes an interruption, or whether to disconnect a call after a certain number of errors. In a preferred embodiment, a call is never disconnected once a customer has begun providing payment information, no matter how many errors are detected by the system. Other error correcting variables involve the degree of certainty the Voice Recognition Application has that a customer response conforms to an expected value. The Voice Recognition Application verifies that each vocal response is or is not understood to conform with expected values.

If the Voice Recognition Application reports certainty below a user-defined level of confidence that a response was parsed correctly, the system may ask the customer to repeat themselves, if certainty is close to a high level, the system will confirm the information the customer provided, and if certainty is above a certain level of confidence, the system assumes that the customer's response has been properly understood. The level of confidence at which the system will assume that a customer's response has been properly understood is a user-defined quantity that can be varied at each prompt. In one embodiment of the invention, for example, if a customer is asked to provide payment information, the Call Management System will accept that the response was understood if the Voice Recognition Application reports a confidence level of 80% or higher, if the Voice Recognition Application reports a confidence level between 60% and 80% the Call Management System will confirm that the response was understood by playing a prompt that repeats the payment information as interpreted by the Voice Recognition Application, and will play a prompt asking the customer to repeat the information if the Voice Recognition Application reports a confidence level below 60%. However, if the customer is prompted with a question for which the system expects a yes or no answer, the system may assume that any response that is not parsed to a certainty above an 80% confidence level is a negative response.

For example, a customer may be asked "Are you interested in our offer today?" If the Voice Recognition Application reports less than a user-defined level of confidence that the customer response was understood, the Call Management Application will assume that the response was negative. If the application is configured to detect only a yes or no response to a prompt, the customer may not be prompted to repeat themselves if the response is not confidently understood. In another example, a customer may be asked how many items they would like to buy. If the Voice Recognition Application reports that an answer of "one" is understood below a user-defined level of confidence the Call Management Application will assume that an answer of "none" was given by the customer, and if "one" is assumed above the user-defined level of confidence the Call Management Application will assume that the customer intended to answer "one"—the customer is not asked to repeat themselves if their answer is interpreted as one or less. Other user-defined confidence levels and default responses may be configured for any prompt.

Another variable allows the system to account for the customer's emotional needs. Words indicating negative mood may trigger alternative recordings to be played. For example, if the customer is asked "How are you feeling?," if a positive response is given, the system may play a recording that states "I'm glad to hear that", but if a customer gives a negative response, the system may play a recording that states "I'm sorry to hear that". Positive and negative responses may be detected by parsing responses, by assuming a default positive or negative response based on the length of an answering utterance, or by assuming a default positive or negative response if the Voice Recognition Application reports below a user-defined level of confidence that the customer's response was parsed correctly.

Other factors in a call interaction can include the amount of time to wait after a called party's response and the playing of a recording, whether a vocal response is parsed by the voice recognition application or assumed to be a default response, the appropriate destination for a call transfer, or the number of errors allowed before a default action is taken, such as the called party is automatically transferred to a live agent or the call is disconnected. Other factors include whether the system will accept touch-tone inputs, and whether the system will allow a called party to "barge-in" to a recording, giving a response that can be processed before the recording finishes playing. If "Barge-in" is allowed, the system will stop playing the recording and allow the called party to answer.

Figure 2:
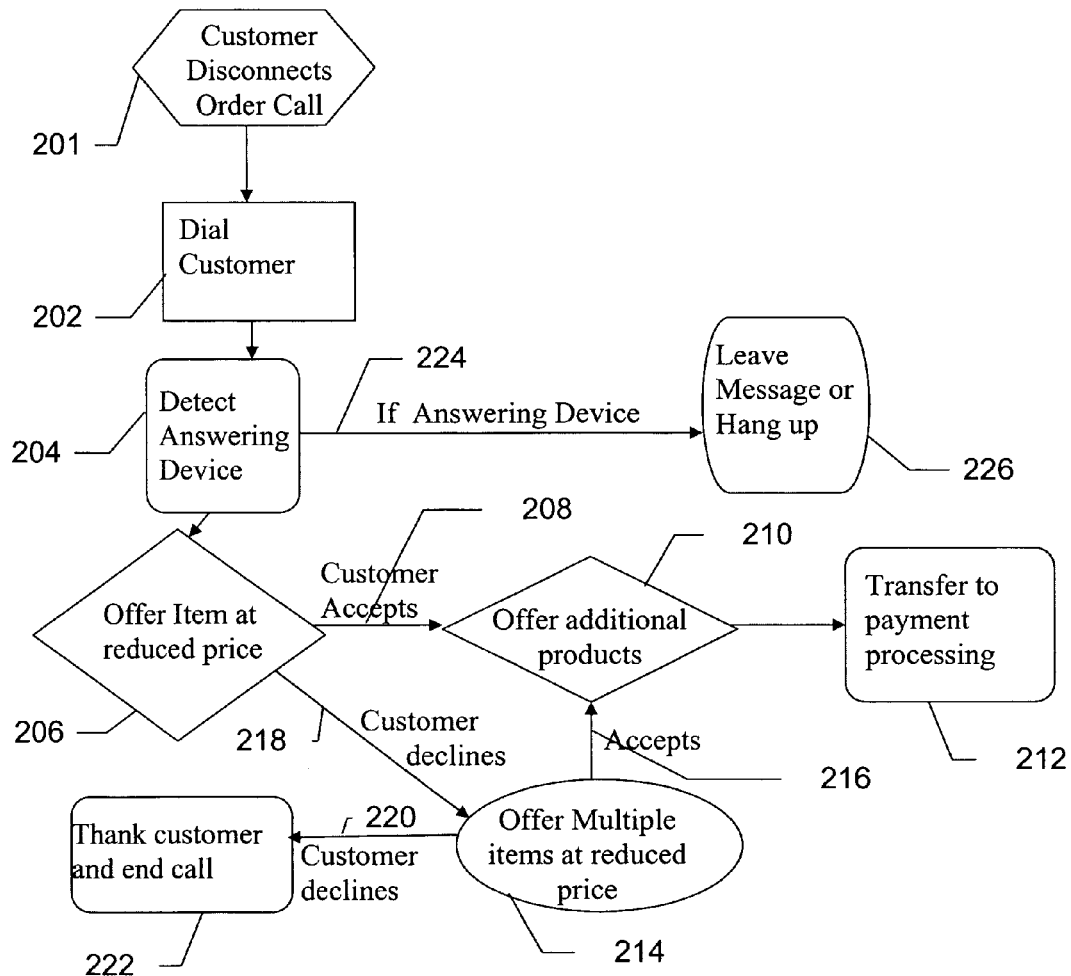
FIG. 2 is an illustration of a sample outgoing sales order call flow chart.

An example 200 of an outgoing sales order call is shown in FIG. 2. View 200 shows possible interactions during an outgoing sales call. View 200 displays actions taken happens after a customer disconnects an incoming sales order call 201. After the call is connected 202, it is determined whether an automated answering device has answered the call 204. If a live person has answered the call, a recording plays explaining the purpose of the call, and the item that had been requested in the original sales order call is offered at a reduced price 206. If the customer accepts the new offer 208, they are offered additional products 210. After the customer accepts or rejects the offer for additional products, they are guided through a series of prompts that ask for payment information. If the customer declines the initial offer, they are offered multiples of the item at a reduced price per item 214. If they accept this offer, they are again offered additional products 210. If the customer declines 220 the offer for multiple items 214, the call ends 222. If an automated answering device is detected after the call is connected 224, either a message is left or the call is ended 226, depending on user configuration.

Figure 3:
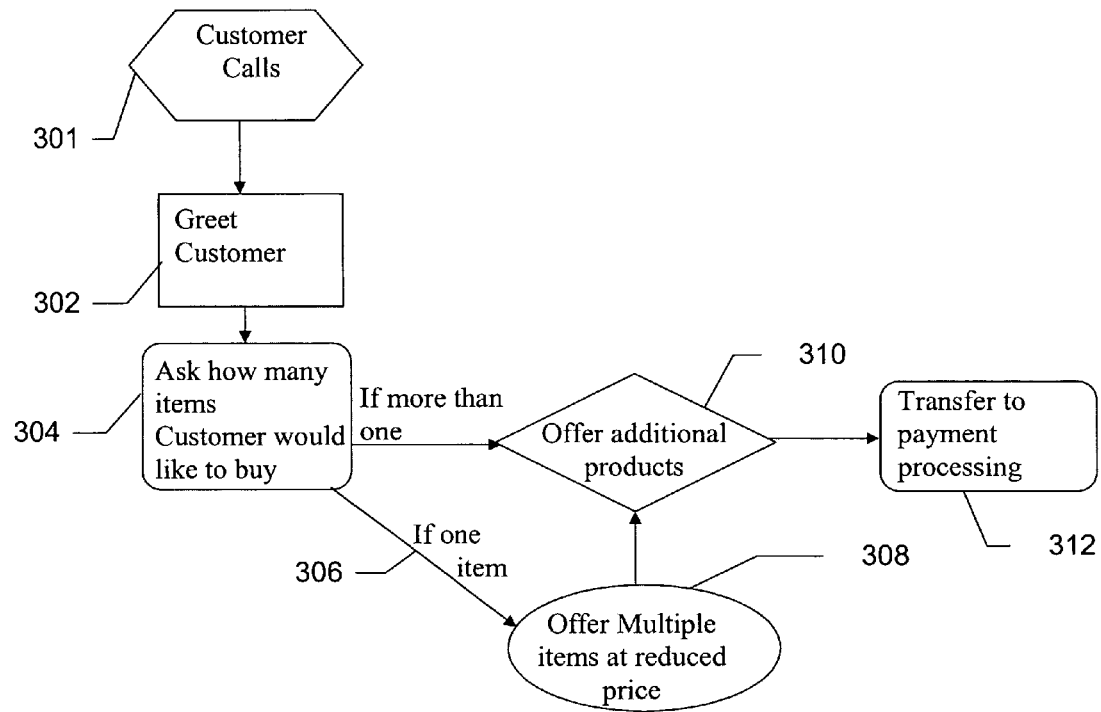
FIG. 3 is an illustration of a sample incoming sales order call flow chart.

An example 300 of an incoming sales order call is shown in FIG. 3. View 300 shows possible interactions during an incoming sales call. View 300 displays actions taken happens after a customer calls 301. A greeting is played and the product offering is introduced 302. The customer is asked how many items they wish to purchase 304. If the customer indicates they wish to buy one item 306, they are offered multiples of the item at a reduced price 308. Whether they accept or decline, they are also offered additional products 310. Once the customer has been offered alternative product offers, they are guided through a series of prompts that ask for payment information 312. If the customer initially asks for multiple items, they are asked if they wish to purchase additional products 310, and then prompted for payment information 312.

What is claimed is:

1. A method for telephonic sales order processing, the method steps comprising:
   establishing a call connection with a called party;
   playing a recorded greeting over the call connection;
   monitoring a vocal response of a called party;
   repeating the recorded greeting, if the monitored vocal response does not match a user-defined expected quantity;
   identifying the meaning of the vocal response of the called party substituting responses with a default response if the responses can not be verified;
   playing a recording in response to the vocal response of the called party;
   repeating the recording if an audible interruption occurs before the playing of the recording is completed;
   and
   storing the vocal response on a non-transitory computer-readable medium using a computer.

2. The method of claim 1, wherein a response of the called party includes a Dual-Tone-Mutli-Frequency (DTMF) response.

3. The method of claim 1, wherein any input not DTMF and less than 1 second long qualifies as a monitored vocal response that does not match the user-defined expected quantity.

4. The method of claim 1, wherein a user-defined option allows the vocal response less than 1 second long to qualify as not matching the user-defined expected quantity.

5. The method of claim 1, wherein if the vocal response cannot be verified above a user-defined confidence level, a further recording asks the called party to repeat themselves.

6. The method of claim 1, wherein barge-in during the playing of a recording can be ignored based on configuration.

7. The method of claim 1, wherein during the playing of a recording only DTMF tones are recognized based on user configuration.

8. The method of claim 1, wherein several recordings are played in sequence.

9. The method of claim 8, wherein the vocal response ignored while any one of the several recordings is played, but wherein after the any one of the several recordings is complete no subsequent recording is played until an additional vocal response is detected.

10. The method of claim 9, wherein if the detected additional vocal response matches a user-defined expected quantity, the next recording in the sequence is played.

11. The method of claim 8, wherein barge-in during the playing of a recording can be ignored based on configuration.

12. The method of claim 1, wherein if the vocal response of the called party cannot be identified after a user-defined number of attempts, the call connection is transferred to a live agent.

13. The method of claim 1, wherein several recordings are played in sequence without waiting for a response.

14. The method of claim 13, wherein if an audible interruption is detected for longer than 1 second during the playing of a recording, an alternative recording is played and then the recording that was playing at the time of the audible interruption is re-played.

15. A method for telephonic sales order processing, the method steps comprising:
   connecting an outgoing call wherein no information is known about a called party except a call destination;
   playing a recorded greeting during the call to the called party;
   monitoring vocal responses of the called party;
   identifying the meaning of the vocal responses of the called party substituting responses with a default response if the responses can not be verified;
   playing a recording in response to the vocal responses of the called party;
   and
   storing the vocal responses on a non-transitory computer-readable medium using a computer.

16. The method of claim 15, wherein several recordings are played in sequence without any interruption.

17. The method of claim 16, wherein one of said vocal responses is detected but ignored while a recording is played, but wherein after the recording is complete no subsequent recording is played until a subsequent vocal response is detected.

18. The method of claim 17, wherein if the detected subsequent vocal response matches a user-defined expected quantity, the next recording in the sequence is played.

19. The method of claim 17, wherein if the detected subsequent vocal response does not match a user-defined expected quantity, the recording is repeated.

20. The method of claim 15, wherein if the detected subsequent vocal response of the called party cannot be identified after a user-defined number of attempts, the call is transferred to a live agent.

21. The method of claim 15, wherein a request by the called party not to be called is recognized and a telephone number associated with the called party is added to a do not call list.

22. A method for telephonic sales order processing, the method steps comprising:
   making a call connection;
   playing a recorded greeting over the call connection;
   monitoring vocal responses of a called party;
   identifying the meaning of the vocal responses of the called party;

substituting the vocal responses of the called party with an user-defined default response if the vocal responses cannot be verified above a user-defined confidence level;

playing a recording in response to the vocal responses or user-defined default response of the called party; and storing the vocal responses or an indication of the user-defined default response on a non-transitory computer-readable medium using a computer.

\* \* \* \* \*